June 13, 1944. E. W. WELP 2,351,308
FILTER UNDERDRAIN
Filed March 1, 1943
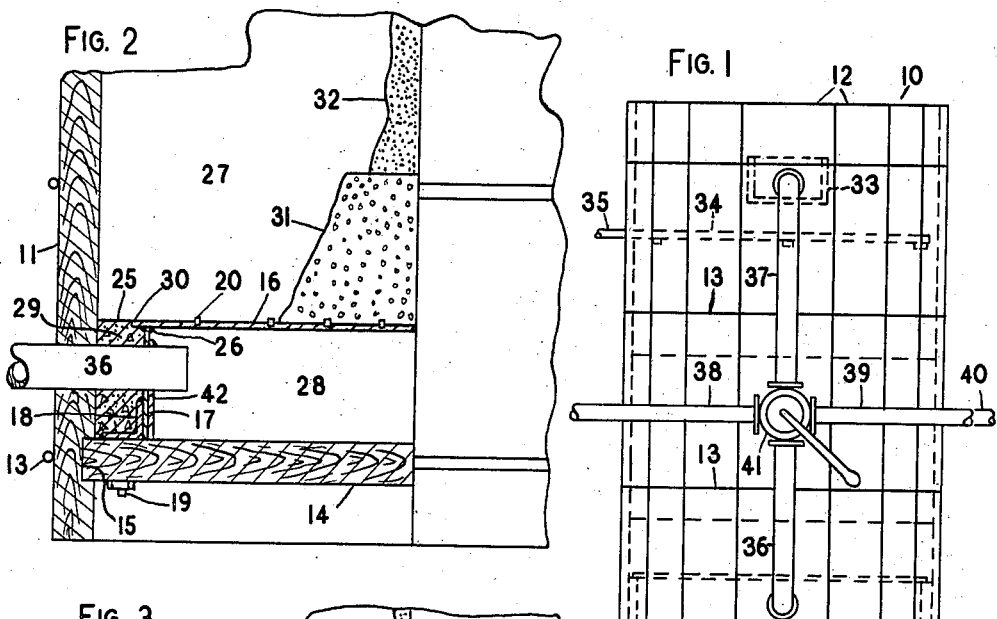
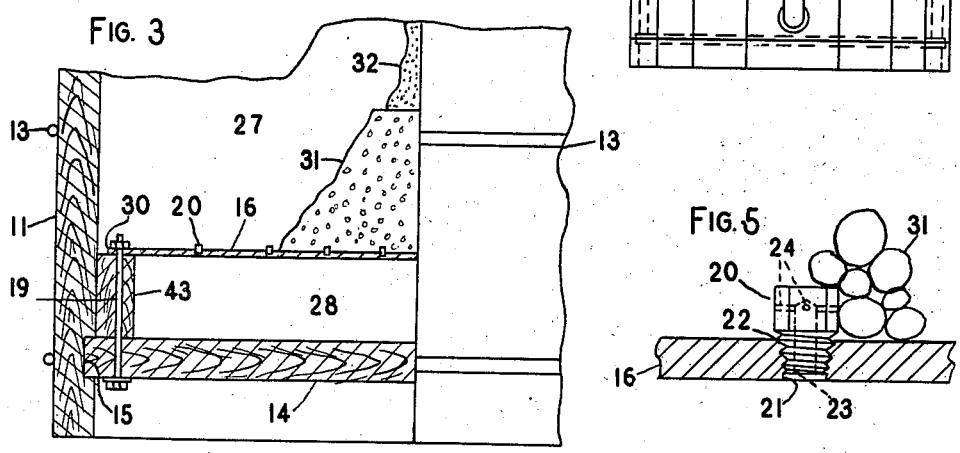
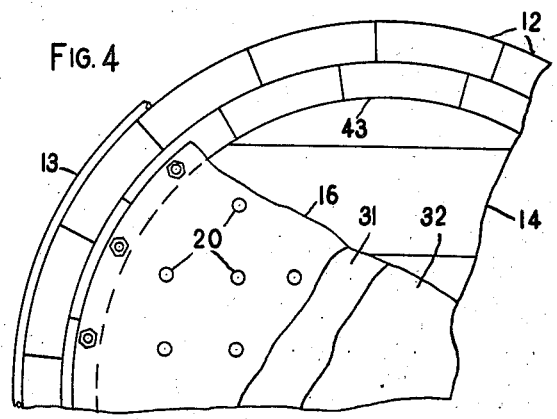
INVENTOR
EDWARD W. WELP
BY Francis D Rogers
ATTORNEY Patented June 13, 1944

2,351,308

UNITED STATES PATENT OFFICE 2,351,308

FILTER UNDERDRAIN

Edward W. Welp, Chicago, Ill., assignor to Graver Tank & Mfg. Co., Inc., a corporation of Delaware Application March 1, 1943, Serial No. 477,670

5 Claims. (Cl. 210—124)

This invention relates to apparatus of the filter type, and particularly such apparatus the major portion of which is constructed from wood staves held together by hoops.

Filter tanks of wood are well known to the art, but difficulties came up, especially in connection with the underdrains. Other filter tanks, constructed from steel, were highly successful. A most efficient underdrain in steel tanks consists of a flat steel plate, welded to the steel shell around the periphery and having numerous strainer fittings with small openings distributed over the surface of said plate. A bed of gravel is ordinarily placed on top of such a plate. The filtering material, such as sand, anthracite, zeolite, or the like, is supported by the gravel. The distribution of backwash water, as well as the taking up of water in downward filtration, in the brining and rinsing of zeolite filters, and so on, is satisfactorily realized by means of said underdrain construction, which at the same time is extremely durable and inexpensive. Other constructions, such as pipes installed above the bottom, give rise to various difficulties, due to accumulation of stagnant water or brine below the pipes, and the like.

The main object of this invention is to make the desirable features of said steel tank underdrain available to wood tanks. The difficulty is that in the making of wood tanks the shape and size of the wall portion of the tank is subject to change, and the simple and efficient welding of the plate to the wall is out of question. The staves for the wood wall are initially shaped, set up, and tied together by the hoops, so that the inner edges of the staves are in contact and compression. The staves are then moistened and caused to swell, with the hoops tightened. Incident to this process the precise shape of the inner side of the wall, or series of staves, is subject to some change, due to compression and distortion of the staves. Additional irregularities are sometimes caused by the swelling of planks in the bottom of the tank. These changes and irregularities are of minor proportion as compared with the area of the tank, but are quite considerable in relation to the size of the strainer orifices provided in said steel plates. As a result, such steel plates when heretofore installed in wood tanks, allowed the backwash water to escape in great amounts around the periphery, reducing the amount distributed through the central portion of the underdrain, and reducing the efficiency of the backwash.

It is a further object of my invention to provide apparatus which is free from said defects and shortcomings of prior art devices.

Other objects may appear from the following disclosure.

In the drawing:

Figure 1 is a front elevation of apparatus according to this invention.

Figure 2 is an enlarged front elevation, partly in section, of a detail from Figure 1.

Figure 3 is a similar view of a modified detail.

Figure 4 is a plan view of the detail of Figure 3.

Figure 5 is a still more enlarged elevation, partly in section, of a detail from Figure 2.

The invention is illustrated by a zeolite softener 10, although it is applicable to other devices of the filter type also. The softener has a substantially cylindrical side wall 11 composed of a series of wood staves 12 which are properly shaped and bevelled, and held together by hoops 13. A substantially circular bottom 14 is held in an annular groove 15 in the bottom part of the series of staves, closing the tank at its underside.

A round and flat steel plate 16 is disposed in the tank concentrically with respect to the wall 11 and bottom 14 and spaced above said bottom. This plate is held in the aforesaid position by means of a substantially cylindrical steel ring 17 concentrically welded to the outer part of the plate, an annularly bent L-beam 18 welded to the ring 17, and bolts 19 holding this L-beam 18 to the bottom 14.

The plate 16 has regularly distributed over most of its surface, small fittings 20 which are preferably made of stainless steel, so that no corrosion may occur when water, salt-brine, or various other materials contact the plate 16 and fittings 20. Each fitting 20 is screwed into a tapped hole 21 of the plate 16 by means of a pipe thread 22 on the fitting. Each fitting has a relatively large blind hole 23 drilled into its underside and ending short of the top, and a plurality of small drill holes 24 drilled into or through the sides of the fitting and establishing horizontal connections between the large hole 23 and the outside. These horizontal passages are located a short distance above the plate 16 and cause a most desirable flow of fluid in the backwash of the filter, as well as incident to downward filtering, brining, rinsing, and so on.

The plate 16 is somewhat smaller than the inside of the wall 11 is either during or after the making and starting of the filter tank. Thus the plate 16 and the bolting-down ring 18 are easily inserted in the wood tank, and bolted down with the aid of standard tools. A certain clearance remains between the plate 16 and the wall 11 after completion of the tank, as shown at 25. This clearance need not amount to more than a fraction of an inch in order to allow convenient insertion of the plate 16. However, it is quite permissible, and in fact desirable from the standpoint of filter operation, backwash, and so on, that the outermost orifice fittings 20 be spaced at least three inches from the inside of wall 11. Thus the clearance 25 may well be made as large as about two inches. This provides, also, ample room for tools, for the tightening of bolts 19. At the same time, the outermost tapped holes 21 are conveniently spaced from the periphery of the steel plate.

The chamber 27 above the top plane of the plate 16 can be identified as a treatment chamber or zone. The zone 28 below the plate 16 and within the ring 17 is an underdrain chamber. These two zones are necessary for operation of the tank, and they must be sealed from one another so that they communicate with one another only through the small holes 24. The weld-seam 26 between the plate 16 and the ring 17 seals these two members to one another; but some leakage tends to occur between the bolting-down ring 18 and the bottom 14, due to the fact that a slight warpage of the wood bottom cannot be avoided, and such warpage cannot be corrected unless an excessive and expensive number of bolts 19 are used. For this reason, I pour concrete, grout, cement, asphalt or the like into the zone 29 which surrounds the ring 17 and the underdrain chamber 28, whereby said zone is filled by a solid ring of such material, and any leaks of the aforementioned kind are sealed.

This sealing ring 29 of concrete or the like can be held down against the upward pressure of the backwash water by a rim 30 which may be integral with the plate 16, outside of the ring 17, or may be fastened to the plate or ring. The surface of the seal ring 29 is preferably flush with the surface of the plate 16, so that no pools of brine or the like can be formed anywhere, which would pollute the treated water by gradually diffusing into the same.

The plate 16 and seal ring 29 support a bed of gravel 31 which in turn supports the filtering sand or other material 32. Above the latter, a backwash trough 33 is installed in the treatment chamber 27; and a brine distributing system 34 may be installed at any suitable elevation. This system receives brine through the pipe 35. Spent brine is completely withdrawn from the bottom of the filter through the horizontal passages 24 in the fittings 20, through the large drill holes 23, the underdrain chamber 28, and a pipe 36 which communicates with said underdrain chamber. Another pipe 37 communicates with the trough 33 in the treatment chamber 27 and extends through the wall 11 adjacent the trough. Each of the two pipes 36 and 37 provides a path either to or from the respective chamber; and said paths may communicate with a suitable and conventional source of supply 38, path for discharge to service 39, and path for discharge to waste 40, by suitable valve means 41.

The end of the pipe 36 which communicates with the underdrain chamber 28 extends horizontally through a round hole in one of the staves 12 of the wall 11 at a point above the bottom 14 and below the plate 16. This horizontal end of the underdrain pipe 36 extends through the seal ring 29 and support ring 17 and preferably a short distance into the underdrain chamber 28. Inside this chamber the end of pipe 36 carries a vertical shield 42, which may be disposed closely adjacent the inside of the ring 17. This latter ring and the bolting-down ring 18, are cut off or slotted so that after assembling the wood tank itself, the pipe 36 and shield 42 can be installed first; the assembly of plate 16, strainer fittings 20, and rings 17 and 18 can be lowered down next; this assembly can then be bolted down; and finally, by pouring the seal ring 29, all leaks can be eliminated, both around the ring 18 and adjacent the shield 42.

In the modification of Figures 3 and 4, the plate 16 is supported and the chambers 27 and 28 are sealed off from one another by a ring of wood 43, rather than the assembly of a steel support 17 and plastic seal 29 as above described. This supporting and sealing ring of wood 43 may be formed of short staves or in any other suitable manner. It may fill the whole of the annular zone 29 around the underdrain chamber 28, as shown, or only part of said zone. If sufficient bolts 19 are used no further gasket or other seal is required between the plate 16 and the wood ring 43 or between the latter and the bottom 14. Of course, it will be necessary to caulk the bolt holes, in usual manner.

It will be appreciated that some of the aforementioned seal materials, to wit wood and asphalt, are resistant to a weak or dilute acid as well as to the brine that has been mentioned. Such seal materials, accordingly, can be used in an acid-regenerated zeolite softener as well as in a brine-regenerated tank, without protective coatings or other more or less expensive or questionable expedients. Thus the improved underdrain according to this invention can be fully standardized, and the manufacture of various types of zeolite softeners is made more economical.

Various further modifications will occur to persons skilled in the art. I claim:

1. Apparatus of the filter type comprising a series of wood staves assembled to form a substantially cylindrical wall, a bottom to close a lower part of said wall and thereby to form a tank, a flat, circular steel plate of slightly smaller diameter than the inner diameter of said wall, said steel plate having numerous small openings regularly distributed over a major part thereof, which part is concentrically and centrally disposed with respect to said plate, and said steel plate being disposed in said tank substantially concentrically with respect to said wall and bottom and spaced above said bottom, whereby there are formed in said tank a treatment chamber overlying the top plane of said plate, an underdrain chamber underlying said major part of said plate, and an annular zone around said underdrain chamber and below said treatment chamber, means comprising a seal and support ring to hold said plate disposed and spaced as aforesaid and to seal said treatment chamber from said underdrain chamber, said ring being installed in said annular zone, a conduit communicating with said underdrain chamber and extending through said ring and wall to the outside of said tank, and at least one conduit communicating with said treatment chamber and extending to the outside of said tank.

2. Apparatus according to claim 1 wherein said seal and support ring comprises a steel ring welded to a peripheral part of the underside of said plate, an annularly bent flange welded to the bottom of said steel ring, and a ring of plastic material cast in said tank around said steel ring to fill, substantially, said annular zone around said steel ring.

3. Apparatus according to claim 1 wherein said seal and support ring comprises a ring of seal material disposed in said annular zone, and said plate has a peripheral part extending over an inner part of said ring of seal material.

4. Apparatus according to claim 1 comprising a plurality of strainer fittings made of stainless steel, regularly distributed over said major part of said plate, and screwed into said plate, each of said fittings having a large, vertical hole drilled into the underside thereof and a plurality of small horizontal drill holes communicating with the upper end of said large hole and with said treatment chamber closely above said plate.

5. Apparatus according to claim 1 wherein said seal and support ring comprises a ring of wood disposed in said annular zone, and said plate has a peripheral part extending over an inner part of said ring of wood.

EDWARD W. WELP.